United States Patent [19]

Sudau et al.

[11] Patent Number: 5,733,218
[45] Date of Patent: Mar. 31, 1998

[54] FLYWHEEL HAVING TWO CENTRIFUGAL MASSES AND A TORSIONAL VIBRATION DAMPER WITH GEAR TRAIN ELEMENTS WHICH CAN BE ADJUSTED AS A FUNCTION OF LOAD

[75] Inventors: Jörg Sudau, Niederwerrn; Erwin Wack, Oberwerrn, both of Germany

[73] Assignee: Fichtel & Sachs AG, Schweinfurt, Germany

[21] Appl. No.: 598,381

[22] Filed: Feb. 8, 1996

[30] Foreign Application Priority Data

Feb. 9, 1995 [DE] Germany .......... 195 04 209.3

[51] Int. Cl.⁶ .................. F16F 15/131; F16F 15/16; F16D 13/60; F16H 57/12
[52] U.S. Cl. .................. 475/347; 192/70.17; 74/574
[58] Field of Search ............... 192/70.17, 212; 74/574, 573 R, 573 F; 475/346, 347; 464/24, 66, 67, 68

[56] References Cited

U.S. PATENT DOCUMENTS

| | | | |
|---|---|---|---|
| 2,543,811 | 3/1951 | Snow et al. | 475/346 |
| 2,893,268 | 7/1959 | Liebel | 475/346 |
| 2,939,346 | 6/1960 | McCarthy et al. | 475/346 X |
| 3,540,311 | 11/1970 | Chillson | 475/346 X |
| 3,583,252 | 6/1971 | Shipitalo et al. | 475/346 X |
| 3,696,789 | 10/1972 | Winter et al. | 475/346 |
| 4,092,878 | 6/1978 | Campbell | 475/346 X |
| 4,573,374 | 3/1986 | Koshimo et al. | |
| 4,944,195 | 7/1990 | Takahashi et al. | 475/346 X |
| 5,551,928 | 9/1996 | Sudau | 475/347 |

FOREIGN PATENT DOCUMENTS

| | | |
|---|---|---|
| 0041708 | 12/1981 | European Pat. Off. |
| 0113202 | 7/1984 | European Pat. Off. |
| 4128868 | 3/1993 | Germany. |
| 9414314 | 1/1995 | Germany. |
| 2285109 | 6/1995 | United Kingdom. |

Primary Examiner—Charles A. Marmor
Assistant Examiner—Saul J. Rodriguez
Attorney, Agent, or Firm—Nils H. Ljungman and Associates

[57] ABSTRACT

A torsional vibration damper has an input-side transmission element and an output-side transmission element, at least one of which is connected, preferably by means of a spring device, with at least one moment-transmitting element of a gear train which acts between the two transmission elements. At least one of the moment-transmitting gear train elements can be aligned before the creation of a connection to the corresponding element with some play, or clearance, at least in the radial direction, with respect to this element carrier, and after the application to the gear train of an adjustment moment which effects an alignment of this transmission element with respect to the other transmission elements as a function of the force by moving the two transmission elements into a predetermined relative position, the gear train element in question can be provided with a connection to the element carrier which fixes the element in its position where it has been aligned as a function of the force.

13 Claims, 5 Drawing Sheets

FLYWHEEL HAVING TWO CENTRIFUGAL MASSES AND A TORSIONAL VIBRATION DAMPER WITH GEAR TRAIN ELEMENTS WHICH CAN BE ADJUSTED AS A FUNCTION OF LOAD

BACKGROUND OF THE INVENTION

1. Field of the Invention

The present invention generally relates to a torsional vibration damper, in particular for clutches of motor vehicles, with an input-side transmission element and an output-side transmission element, at least one of which is connected, preferably by means of a spring device, with at least one moment-transmitting, or torque-transmitting, element of a gear train which acts between the two transmission elements.

2. Background Information

German Utility Model No. 94 14 314 discloses a torsional vibration damper, in particular for clutches of motor vehicles, with an input-side transmission element and an output-side transmission element, the latter of which is fastened to a ring gear which acts as a moment-transmitting, or torque-transmitting, gear train element of a planetary gear train which acts between the two transmission elements. For its part, the ring gear is connected by means of planet wheels to a sun wheel which is fastened to the input-side transmission element. The planet wheels, like the sun wheel, are active as moment-transmitting elements of the planetary gear train.

When a moment corresponding to a torsional vibration is applied to the input-side transmission element, this moment is transmitted via the sun wheel to the planet wheels, and after it has been distributed by the planet wheels, this moment is transmitted both to the ring gear and to planet carriers which are located on both sides of the planet wheels and support the planet wheels, which planet carriers are connected to the output-side transmission element by means of a spring device. The gear wheels of the planetary gear train are accordingly constantly in motion in the event of asynchronous movements, or torsional vibrations, of the drive system which is located upstream of the torsional vibration damper. If, and to the extent that there are manufacturing tolerances present, which can be reflected in incorrect center distances between the individual gear wheels, or in angular offsets between the centers of at least one of the planet wheels with respect to the center of the sun wheel or of the ring gear in the peripheral direction, problems can occur in the vicinity of the gear teeth, in that either the depth of engagement of the teeth with one another or the alignment of the engagement flanks of the gear teeth with respect to one another will not occur in the desired manner.

Consequently, the distribution of moments and the distribution of the load to the individual planet wheels is changed, so that there can be overloads on some axles, or planet wheels, which can result in the failure of the torsional vibration damper as the result of a failure of the planetary gear train.

OBJECT OF THE INVENTION

An object of the present invention is to improve the gear train in a torsional vibration damper which has a gear train, so that an overloading of the individual elements of the gear train can essentially be prevented.

SUMMARY OF THE INVENTION

The present invention teaches that this object can be accomplished by at least one of the gear train elements being aligned, before the creation of a connection with the respective element carrier, with clearance, or play, at least in one predetermined direction with respect to this element carrier, and after the application to the gear train of an adjustment moment which effects an alignment of this gear train element with respect to the other moment-transmitting transmission elements as a function of load by moving the two transmission elements into a predetermined relative position, can be provided with a connection which fixes the gear train element in its aligned position as a function of the load with respect to the element carrier.

For this purpose, one preferred embodiment of the present invention indicates that before the creation of a connection with a respective corresponding element carrier, at least one of the moment-transmitting gear train elements can be aligned with respect to this element carrier with clearance, or play, at least in one predetermined direction. Then, an adjustment moment is applied, preferably by means of the input-side transmission element, by means of which the input-side transmission element can be angularly displaced by a predetermined amount with respect to the output-side transmission element. The magnitude of this angle, in which angle the two transmission elements are held relative to one another, is advantageously measured (i.e. determined individually) for each model of clutch, and is preferably the angle at which a static load acts on the moment-transmitting gear train elements and results in the optimum alignment of the gear train elements which have some play with respect to the other gear train elements. In this case, when the moment-transmitting gear train elements are formed by gear wheels, the forces which are active between their gear teeth in the radial and in the peripheral direction are used to align at least one of the gear wheels, which is oriented in the radial direction with some play with respect to the respective element carrier, whereby the alignment distance is a maximum of the specified play between the transmission element which has some play and the corresponding element carrier.

By aligning the gear wheel which has some play with respect to the other gear wheels which are engaged with it in the radial direction, the center distances between the individual gear wheels can be corrected, while by means of a movement of the gear wheel which has some play relative to the other gear wheels in the peripheral direction, a correction of the angular offset of the axes of the gear wheels relative to one another in the peripheral direction can become possible. When the adjustment moment is introduced, this alignment can be made automatically, as described above, with a displacement of the two transmission elements relative to one another, and is fixed, by fastening the transmission element which has the play to the corresponding element carrier while the two transmission elements remain in the displaced position, thereby creating a connection to the corresponding element carrier. For example, when a sun wheel is used as the gear train element, if the sun wheel is aligned so that the sun wheel has play on a hub of the drive-side transmission element, the sun wheel can be fastened to the drive-side transmission element, so that the drive-side transmission element in this case functions as the element carrier. Likewise, when the planetary gear train is realized as described in the above-referenced German Utility Model No. 94 14 314 with a ring gear fastened on the output-side transmission element, the ring gear can be realized so that it has some play with respect to this transmission element. It is also conceivable that the planet wheels of a planetary gear train can be mounted with play in a planet carrier. Regardless of whether one of the transmission elements or a planet carrier acts as the element carrier for the respective gear wheel, as described above, whichever gear wheel has play can be fixed in position after alignment with respect to the other gear wheels on the corresponding element carrier, and can thus be secured against movements, at least in the radial direction.

The securing of the gear train element, which has play, on the corresponding element carrier against movements in those directions in which there is play, can either be done by creating a non-positive connection between the gear train element and the element carrier, or by creating an integral connection between the two elements, e.g. by welding.

As soon as the gear train element which has the play is fastened in its aligned position on the corresponding element carrier assumed under the action of the adjustment moment, the introduction of the adjustment moment into the torsional vibration damper is neutralized, whereupon the two transmission elements can pivot back into their original position. Naturally, the gear train element which has the play remains in its aligned position during this reverse movement.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the present invention resides broadly in a transmission system for a motor vehicle, the transmission system comprising: a flywheel assembly, the flywheel assembly having an axis of rotation and defining an axial direction parallel to the axis of rotation; a pressure plate disposed adjacent the flywheel assembly; a clutch disc disposed between the pressure plate and the flywheel assembly; the clutch disc comprising friction linings for contacting the pressure plate and the flywheel assembly upon engagement of the clutch disc; a clutch housing disposed adjacent the pressure plate and being releasably fastened to the flywheel assembly; the pressure plate being movably fastened to the clutch housing; the pressure plate comprising means for engaging the clutch disc with the flywheel assembly; the flywheel assembly comprising: a first flywheel portion, the first flywheel portion comprising means for fastening the first flywheel portion to a crankshaft of an internal combustion engine; a second flywheel portion disposed adjacent the first flywheel portion, the second flywheel portion being rotatable with respect to the first flywheel portion; a planetary gear system; the planetary gear system comprising a plurality of gear components; the gear components comprising: a) a sun gear, b) a ring gear, and c) at least one planetary gear; means for fastening one of the gear components a), b), and c) to one of: the first flywheel portion; and the second flywheel portion; the fastening means for fastening one of the gear components a), b), and c) to one of: the first flywheel portion; and the second flywheel portion; and one of the gear components a), b), and c) comprising means for providing clearance between the means for fastening and one of: one of the flywheel portions; and one of the gear components a), b), and c) fastened by the fastening means.

Another aspect of the present invention resides broadly in a method of assembling a transmission system for a motor vehicle, the transmission system comprising: a flywheel assembly, the flywheel assembly having an axis of rotation and defining an axial direction parallel to the axis of rotation; a pressure plate disposed adjacent the flywheel assembly; a clutch disc disposed between the pressure plate and the flywheel assembly; the clutch disc comprising friction linings for contacting the pressure plate and the flywheel assembly upon engagement of the clutch disc; a clutch housing disposed adjacent the pressure plate and being releasably fastened to the flywheel assembly; the pressure plate being movably fastened to the clutch housing; the pressure plate comprising means for engaging the clutch disc with the flywheel assembly; the flywheel assembly comprising a first flywheel portion, the first flywheel portion comprising means for fastening the first flywheel portion to a crankshaft of an internal combustion engine; a second flywheel portion disposed adjacent the first flywheel portion, the second flywheel portion being rotatable with respect to the first flywheel portion; a planetary gear system; the planetary gear system comprising a plurality of gear components; the gear components comprising: a) a sun gear, b) a ring gear, and c) at least one planetary gear; means for fastening one of the gear components a), b), and c) to one of: the first flywheel portion; and the second flywheel portion; the fastening means for fastening one of the gear components a), b), and c) to one of: the first flywheel portion; and the second flywheel portion; and one of the gear components comprising means for providing clearance between the means for fastening and one of: one of the flywheel portions; and the one of the gear components fastened by the fastening means; the method comprising the steps of: providing a flywheel assembly, the flywheel assembly having an axis of rotation and defining an axial direction parallel to the axis of rotation; providing a pressure plate; providing a clutch disc; providing the clutch disc with friction linings for contacting the pressure plate and the flywheel assembly upon engagement of the clutch disc; providing a clutch housing; providing the pressure plate with means for engaging the clutch disc with the flywheel assembly; providing the flywheel assembly with: a first flywheel portion; means for fastening the first flywheel portion to a crankshaft of an internal combustion engine; a second flywheel portion, the second flywheel portion being rotatable with respect to the first flywheel portion; a planetary gear system; providing the planetary gear system with a plurality of gear components, the gear components comprising: a) a sun gear, b) a ring gear, and c) at least one planetary gear; providing means for fastening one of the gear components a), b), and c) to one of: the first flywheel portion; and the second flywheel portion; and providing one of the gear components a), b),and c) with means for providing clearance between the means for fastening and one of: one of the flywheel portions; and the one of the gear components a), b), and c) fastened by the fastening means; the method further comprising the steps of: disposing the pressure plate adjacent the flywheel assembly; disposing the clutch disc between the pressure plate and the flywheel assembly; disposing the clutch housing adjacent the pressure plate; releasably fastening the clutch housing to the flywheel assembly; movably fastening the pressure plate to the clutch housing; fastening the first flywheel portion to a crankshaft of an internal combustion engine with the fastening means; disposing the second flywheel portion adjacent the first flywheel portion; disposing at least one of the gear components a), b), and c) with respect to another of the gear components a), b), and c); disposing the means for fastening within the means for providing a clearance; aligning the at least one of the gear components a), b), and c)

adjusting a position of the fastening means within the means for providing clearance; and fastening the one of the gear components a), b), and c) to at least one of the one of: the first flywheel portion; and the second flywheel portion while maintaining the position of the means for fastening within the means for providing clearance.

BRIEF DESCRIPTION OF THE DRAWINGS

The present invention is described in greater detail below, and is illustrated in the accompanying drawings, wherein.

DESCRIPTION OF THE PREFERRED EMBODIMENT

Figure 1:
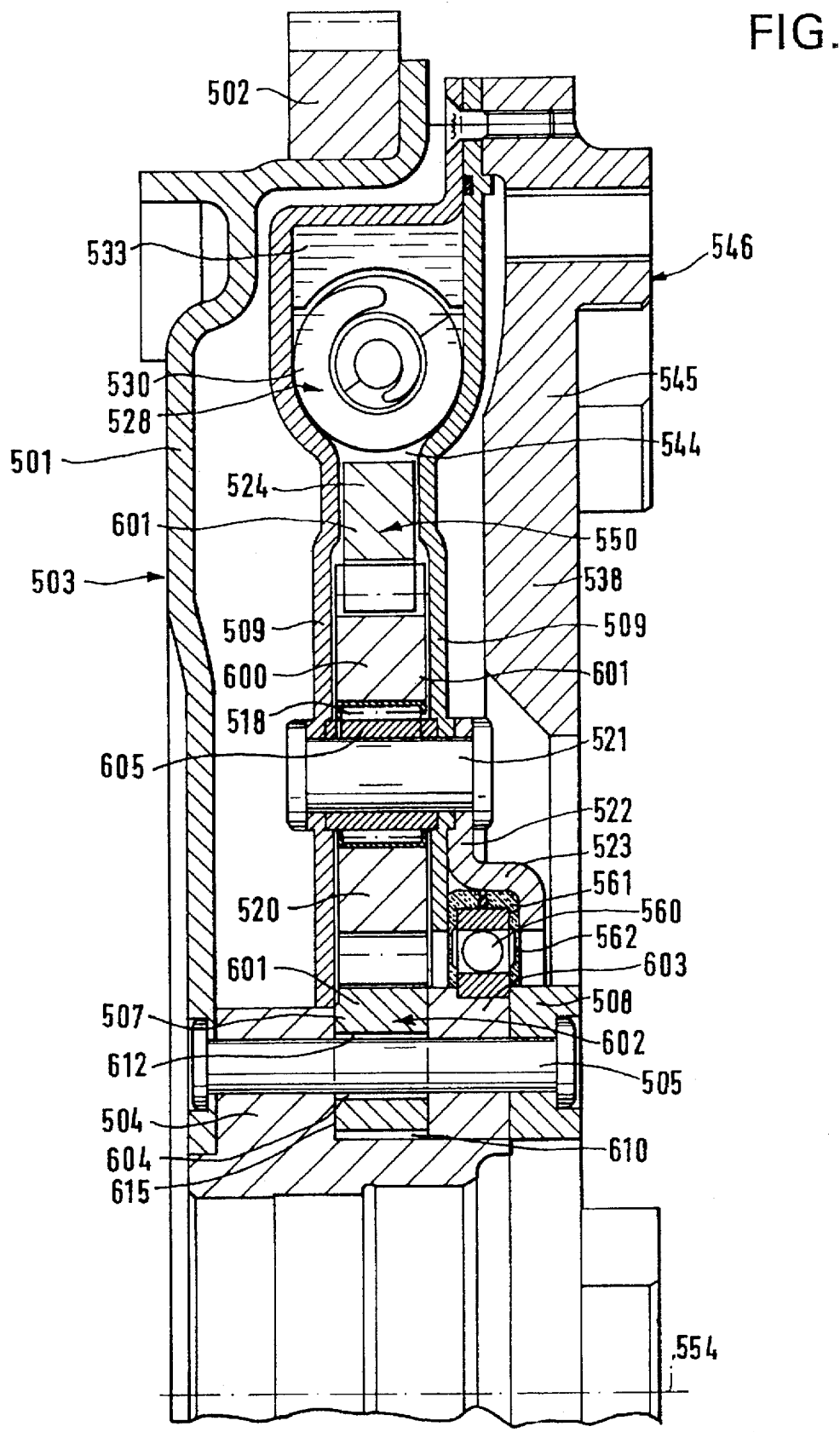
FIG. 1 shows a torsional vibration damper, with a planetary gear train which acts between two transmission elements, in cross section.

FIG. 1 shows a torsional vibration damper which, on its left side, has a centrifugal mass 501 which is used to introduce a drive movement, and is equipped in the peripheral area with a ring gear 502 for a starter pinion (not shown). The centrifugal mass 501 can preferably be designed as the input-side transmission element 503.

The centrifugal mass 501 is fastened to a hub 504, which hub 504 can be located on a crankshaft (not shown) of an internal combustion engine by means of rivets 505, together with a sun wheel 507, of a planetary gear train 602, also located on the hub 504, along with a spacer 603 and a flange 508. The sun wheel 507 can preferably be designed so that its inside diameter is larger than the hub 504, and the sun wheel 507 has passages 604 for the rivets 505. The inside diameter of the passages 604 can be larger than the respective outside diameter of the rivets 505. Between the hub 504 and the inside diameter of the sun wheel 507, there is accordingly a first area which has clearance 610 in the radial direction, while there is a second area 612 which has clearance in the radial direction between the passages 604 and the respective rivets 505.

The planetary gear train 602 has two planet carriers 509 located one on either side of the sun wheel 507. In FIG. 1, the planet carrier 509 on the left extends radially inward to the hub 504, while the planet carrier 509 on the right comes into contact by means of its radially inner end with a plate 561, which plate 561 surrounds a bearing 560. The plate 561 has arms 562, which arms 562 can extend radially inward to grip an inner bearing ring 606 (see FIG. 1a) to essentially guarantee a sealing function with respect to a chamber 544 (which is partly filled with grease and is described in greater detail below), and with respect to the greased area which surrounds the rolling bodies of the bearing 560.

The two planet carriers 509 can be provided with a plurality of bearings 518, e.g. needle bearings, located on essentially equal diameters, each of which bearings 518 can be used to mount a planet wheel 520, which planet wheel 520 can be located between the two planet carriers 509. The two planet carriers 509 are held at a fixed center distance from one another by sleeves 605 and are pulled firmly against the two ends of the respective sleeves 605 by means of rivets 521, which rivets 521 are located in the sleeves 605. The rivets 521 can also create a non-rotational connection between a disc 522 and the planet carrier 509 which faces away from the primary centrifugal mass 501. A shoulder 523, which can be molded onto the disc 522, comes into contact with the side of the plate 561 which faces away from the planet carrier 509.

The planet wheels 520 are in engagement, on one hand, with the sun wheel 507, and, on the other hand, with a ring gear 524 which is also located between the two planet carriers 509 and acts as an intermediate mass 550. The ring gear 524, radially outside its toothed engagement with the planet wheels 520, has recesses (not shown) which are located at specified angular distances from one another. In each of the recesses a spring device 528 can be inserted, which spring device 528 can have a plurality of springs 530. The springs 530 can be connected to one another by means of sliding blocks 533, for example, in the manner disclosed in German Patent No. 41 28 868 A1. The spring device 528 can preferably be supported on one end on the ring gear 524, end on the other end on the planet carrier 509, namely by means of respective actuation means (not shown).

The spring device 528 is located in the axial direction between the two planet carriers 509 which are firmly connected to one another in the radially outer area and with a flywheel 538 of a second centrifugal mass 545. The planet carriers 509 form the boundaries of the above-mentioned chamber 544, which chamber 544 is part of the centrifugal mass 545, whereby the chamber 544 contains the gear wheels 507, 520, and 524, and the spring device 528. The chamber 544 is at least partly filled with a paste medium. The planet carriers 509 secure the gear wheels 520 and 524 in the axial direction. The additional centrifugal mass 545 acts as the output-side transmission element 546, which transmission element 546 is provided to locate a friction or locking clutch in a manner not shown, but which would be well known to one of ordinary skill in the art.

The planetary gear train 602 acts as the gear train 600 which connects the two transmission elements 503 and 546. In the planetary gear train 602, the planet wheels 520 as well as the sun wheel 507 and the ring gear 524 are active as moment-transmitting gear train elements 601, whereby by means of the planet wheels 520, the direction of rotation of the ring gear 524 can be reversed with respect to the direction of rotation of the sun wheel 507.

The alignment of the individual transmission elements 601 with respect to one another can preferably work as follows:

The centrifugal mass 501, the sun wheel 507 and the spacer 603 are pushed onto the hub 504, and after the attachment of the flange 508, are preliminarily secured to prevent movement in the axial direction in a manner which is not illustrated in any further detail. Then, the centrifugal mass 501 is displaced with respect to the centrifugal mass 545 by a specified angle (which has been determined in advance for this type of clutch), which is done by applying an adjustment moment to the hub 504. Under the effect of this adjustment moment, the planet wheels 520 roll along the sun wheel 507, and thereby displace the ring gear 524 on one hand and the planet carriers 509 on the other hand, namely in directions which are different from one another. As a result of the movement of the above-mentioned gear wheels in relation to one another, the adjustment moment introduced is distributed by means of the planet wheels 520 to the ring gear 524 and to the planet carriers 509. During the transmission of the adjustment moment, preferably as a result of the engagement of the gear wheels by means of their gear teeth, there is a mutual load, which results in a movement of the sun wheel 507 in the radial direction, until as a result of the plurality of teeth which are engaged with the different planet wheels 520, an equilibrium of forces is established, which causes a displacement of the sun wheel 507 in the radial direction with respect to the initial position, whereby the maximum displacement distance is equal to the clearance 610 between the inside diameter of the sun wheel 507 and the hub 504. Since there is a radial adjustment capability over the entire peripheral angle of the sun wheel 507, the sun wheel 507 can also rotate slightly in the peripheral direction. As a result of the movement of the sun wheel 507 into this aligned position during the displacement of the centrifugal masses 501 and 545 relative to one another, and as a result of the radial displacement of the sun wheel 507, there is an adjustment of the center distances between the sun wheel 507 and the planet wheels 520, while as a result of the movement of the sun wheel 507 in the peripheral direction, there is a correction of the peripheral angle between the axis of the sun wheel 507 and the axes of the planet wheels 520. In this aligned position, there is a connection of the sun wheel 507 to the input-side transmission element 503 which acts as the element carrier, because rivets 505 are inserted into the corresponding openings of the parts 501, 504, 507, 603 and 508 and are riveted there, so that the sun wheel 507 is held in non-positive contact by means of its end surfaces between the hub 504 and the spacer 603, which hub 504 and spacer 603 are held non-positively on the primary centrifugal mass 501 and the flange 508, respectively. On account of the rivets 505, there is thus a securing in its aligned position of the sun wheel 507 which has some play. The insertion of the rivets 505 into the openings provided for them in parts 501, 504, 507, 603 and 508 is possible in the aligned position of the sun wheel 507, which sun wheel 507 can receive them on account of the presence of the clearance 612.

The sun wheel 507 can also be secured in its aligned position by welding it to the hub 504 at position 615. As soon as the sun wheel 507 is fixed in its aligned position on the input-side transmission element 503, the application of the adjustment moment can be neutralized, so that the transmission elements 501 and 546 can return to their original no-load position. The torsional vibration damper can then be fastened to the crankshaft of a motor vehicle, by means which are not illustrated, but which are well known, so that it can perform its intended function. The torsional vibration damper then works as follows:

When a torque, on which torsional vibrations are superimposed when an internal combustion engine is used as the drive, is applied to the centrifugal mass 501, the movement thereby caused is transmitted to the sun wheel 507 which, on account of the toothed engagement of the sun wheel 507 with the planet wheels 520, drives the planet wheels 520. While the torque is transmitted via the planet wheels 520 to the planet carriers 509 and thus to the output-side transmission element 546 without a change of the direction of rotation, the torsional vibration damper can essentially ensure a reduction in the level of the torsional vibrations introduced with the torque. In this case, since the planet carrier 509, on account of its inertia, initially acts non-rotationally, the movement of the sun wheel 507 is converted into a rotation of the planet wheels 520 around their respective bearings 518 and into a movement of the bearings 518 themselves and of the ring gear 524 around the axle of rotation 554. The moment which corresponds to the torsional vibration is thereby distributed, or split, namely into a first partial moment which is transmitted via the planet wheels 520 to the planet carriers 509, and into a second partial moment which is transmitted to the ring gear 524, which ring gear 524 functions as the intermediate mass 550. If, as illustrated by way of example in FIG. 1, the moment which corresponds to the torsional vibration applied to the sun wheel 507 is aligned in the clockwise direction, then, as a result of the rotation of the planet wheels 520, a first partial moment acting in the counterclockwise direction causes a displacement of the ring gear 524 out of its no-load position, while the planet carriers 509 are driven by a second partial moment which acts in the clockwise direction. Consequently, there is a relative movement between the planet carriers 509 and the ring gear 524, whereby the spring device 528 which is supported on actuation means (not shown) of the ring gear 524 and planet carriers 509, experiences a deformation of the springs 530, and consequently a movement of the sliding blocks 533 along their guide path. The magnitude of the deformation distance of the spring device 528 is naturally a function of the translation ratio of the planetary gear train 602, and thus of the ratio of the number of teeth on the sun wheel 507 and the ring gear 524, respectively. As a result of this translation ratio, the partial moments acting in opposite directions on the ring gear 524 and on the planet carriers 509 can be greater than the input-side moment, but, when they are superimposed on one another, the result is an output-side moment which corresponds to the input-side moment. The output-side moment, however, in contrast to the input-side moment, is largely free of the input-side torsional vibrations (i.e. asynchronous fluctuations), on account of the function of the torsional vibration damper described above.

Since the chamber 544 in the output-side centrifugal mass 545 is filled with a paste medium, the paste medium is displaced during the above-mentioned rolling movement of the planet wheels 520 between the sun wheel 507 and the ring gear 524, and during the deformation of the spring device 528, whereby in the vicinity of the gear teeth, when the teeth are engaged, the paste medium is displaced in the axial direction, where the paste medium encounters the inside of the planet carriers 509, and on account of the rotational movement of the torsional vibration damper, it is discharged radially outward. When there is a deformation of the springs 530 and the resulting approach of the sliding blocks 533 toward one another, the paste medium is also expelled in the direction of the insides of the planet carriers 509. As the speed of displacement of the planet carriers 509 increases, the speed of displacement of the paste medium also increases, both between the gear teeth and in the vicinity of the spring device 528, but the resistance with which the medium opposes this displacement also increases. Consequently, the damping produced by the medium is a function of the respective angular velocity at which the planet carriers 509 are moved relative to the ring gear 524.

Figure 1A:
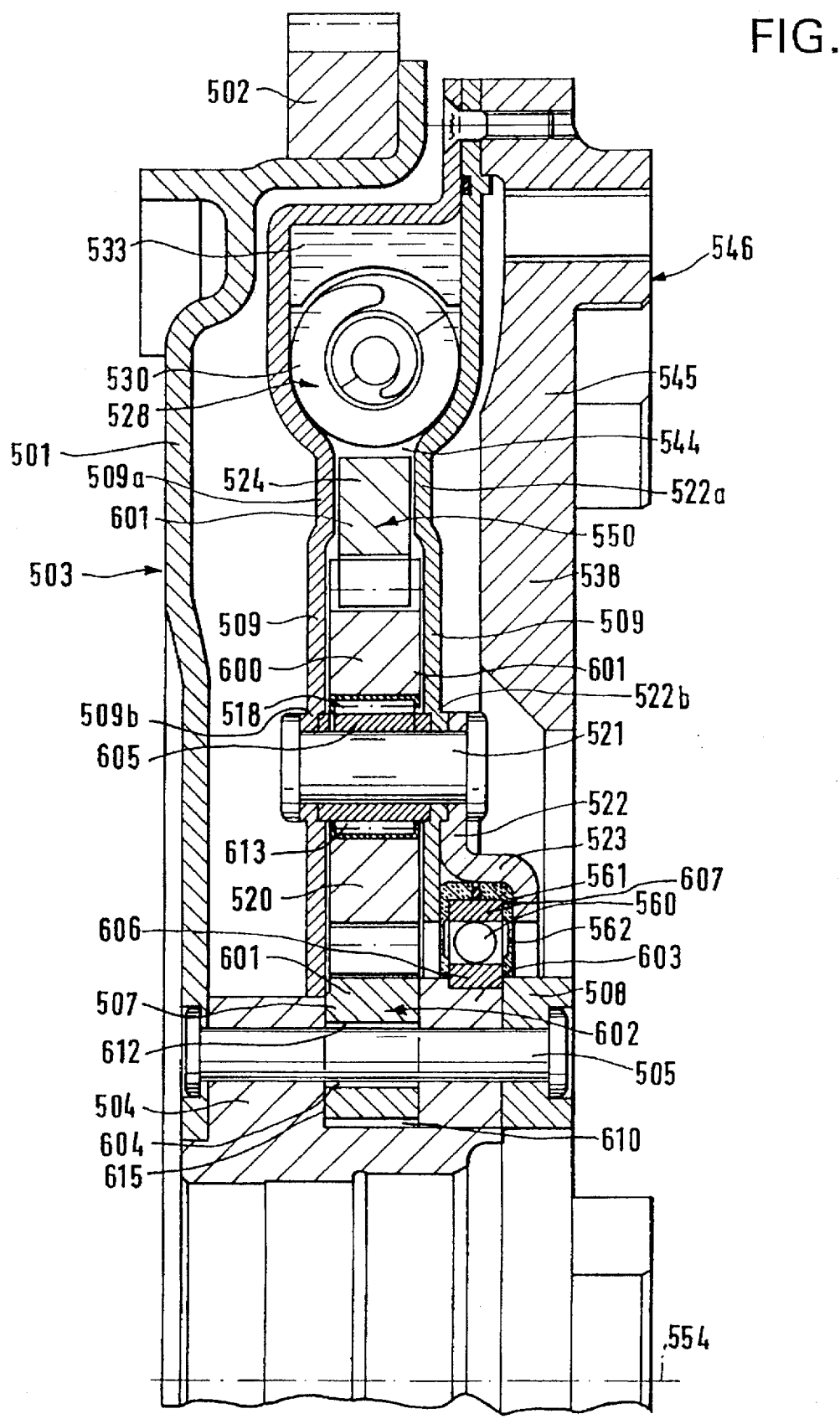
FIG. 1a shows a torsional vibration damper, with a planetary gear train which acts between two transmission elements, in cross section.

In accordance with at least one embodiment of the present invention, alignment of the individual transmission elements 601, with respect to one another, as described hereinabove, can possibly be further facilitated. FIG. 1a shows a planet wheel 520 secured about the sleeve 605 by means of rivet 521. Assembly and alignment of the gear train 601 can essentially be made simpler by providing a clearance 613 circumferentially about the sleeve 605. The alignment of the individual transmission elements 601 with respect to one another can, then, preferably work as follows:

The centrifugal mass 501, the sun wheel 507 and the spacer 603 are pushed onto the hub 504, and after the attachment of the flange 508, are preliminarily secured to prevent movement in the axial direction. Then, the centrifugal mass 501 can be displaced with respect to the centrifugal mass 545 by a specified angle (which angle has been predetermined for this type of clutch), which displacement can be done by applying an adjustment moment to the hub 504. The sleeve 605 and bearings 518 can be inserted in the clearance 613. The planet wheel 520 can then be mounted on the bearings 518 and the sleeve 605. The clearance 613 can preferably allow adjustment of the sleeve 605, bearings 618, and the planet wheel 520 within predetermined parameters. The sun wheel 507 can then be secured, and assembly of the vibration damper can be completed, as described hereinabove with reference to FIG. 1.

In accordance with at least one embodiment of the present invention, the vibration damper can be provided with a bearing 560, as shown in FIG. 1a. The bearing 560 can be surrounded by the plate 561, which plate 561 can have arms 562. The arms 562 of the plate 561 can wrap around the outer bearing ring 607 and the inner bearing ring 606 to securely hold the outer bearing ring 607 and the inner bearing ring 606.

In accordance with at least one embodiment of the present invention, alignment of the ring gear 524 can possibly be simplified by providing a clearance in the outer periphery of the ring gear 524 for a rivet, and, in this case, permitting movement of the sun wheel 507 around the hub 504.

In accordance with at least one embodiment of the present invention, it can be possible to secure the ring gear to the flywheel assembly by a fastening means. The sun wheel can also be secured to the flywheel assembly. The planet wheels, however, can be mounted to a planet carrier, which planet carrier would be mounted within the flywheel assembly so that the planet carrier could rotate independently within the vibration damper.

In accordance with at least one embodiment of the present invention, a clearance or clearances, such as described hereinabove with reference to FIG. 1, may be provided in various other locations in a vibration damper, and can suitably serve the same purpose as described in reference to FIG. 1.

Figure 2:
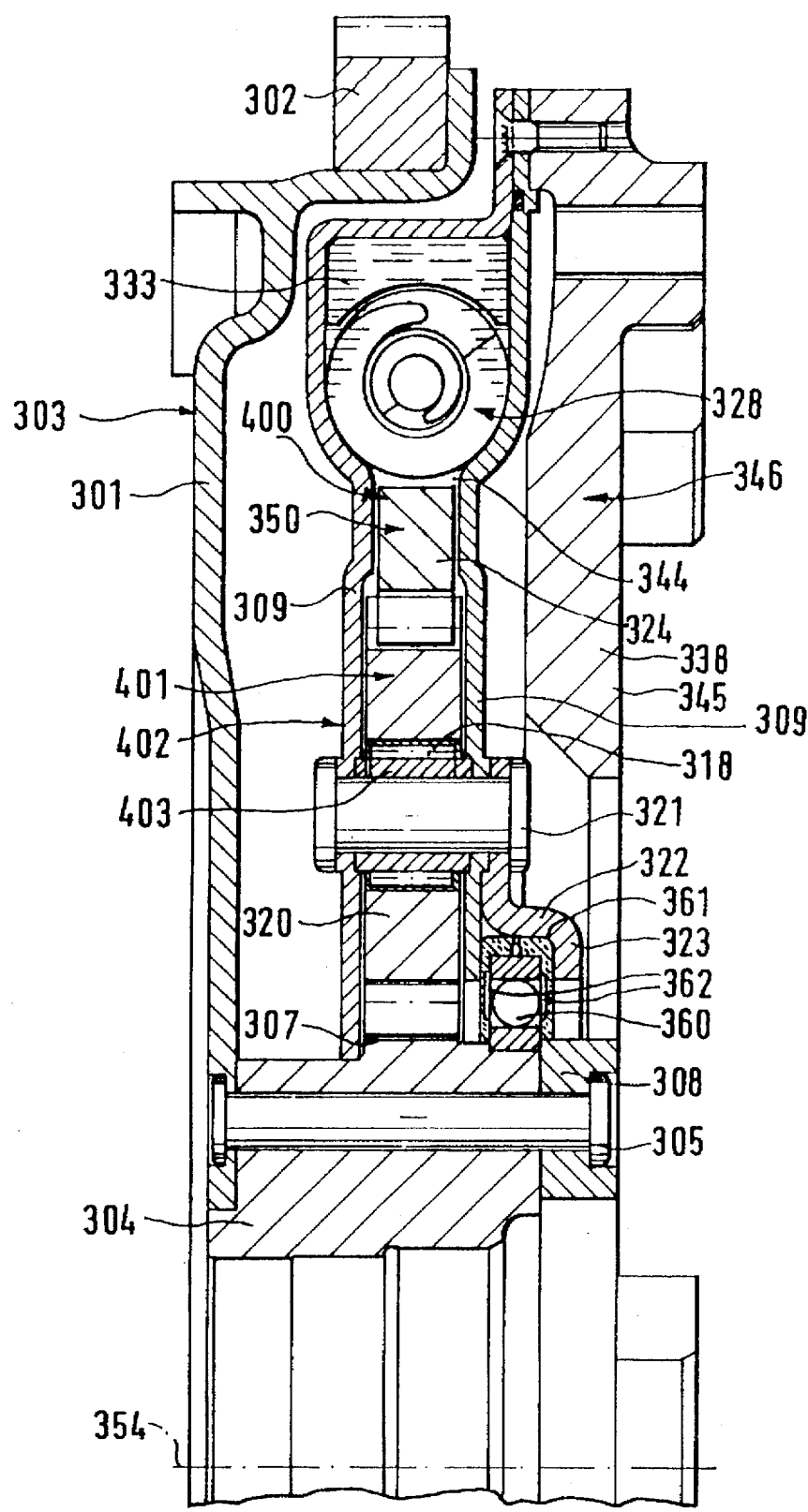
FIG. 2 shows a torsional vibration damper in cross section, with a planetary transmission coupled back to an input-side transmission element.

The disclosure now turns to FIG. 2, which shows a torsional vibration damper with a planetary transmission coupled back to an input-side transmission element. FIG. 2 includes a torsional vibration damper which, on its left side, has a centrifugal mass 301 which acts to introduce a drive motion, and in the peripheral area acts on a starter pinion by means of a gear rim 302. The centrifugal mass 301 acts as the input-side transmission element 303.

The centrifugal mass 301 is fastened to a hub 304, which is located on a crankshaft of an internal combustion engine, by means of rivets 305, together with a sun wheel 307 of a planetary transmission 402 which is also fastened to the hub 304, and a flange 308. The planetary transmission 402 has two planetary carriers 309 located on one either side of the sun wheel 307, the left one of which in extends radially inward to the flange 308, while the right planetary carrier comes into contact by means of its radially inner end with a heat shield 361 which has an L-shaped cross section and protects a bearing 360 against the transmission of heat. The arm 362 of the heat shield 361 which extends radially inward to the inner bearing ring performs a sealing function with respect to a chamber 344 which is at least partly filled with grease and is described in greater detail below.

The two planetary carriers 309 are provided with a multiplicity of bearings, e.g. needle bearings 318, all of which are located on the same diameter. Mounted on each needle bearing is a planet wheel 320 located between the two planetary carriers 309, and each needle bearing is held in the axial direction by sleeves 403 which are located at a fixed distance from one another. The needle bearings are pulled tight against the two ends of the respective sleeve 403 by rivets 321 which are located in the sleeves 403. The rivets 321 also connect a disc 322 non-rotationally with the planetary carrier 309 facing away from the primary centrifugal mass 301, whereby a shoulder 323 molded onto the disc 322 comes into contact with the side of the heat shield 361 which faces away from the planetary carrier 309.

The planet wheels 320 are engaged on one hand with the sun wheel 307, and are engaged on the other hand with a ring gear 324 which is also located between the two planetary carriers 309 and acts as an intermediate mass 350. This ring gear 324, radially outside its area of geared engagement with the planet wheels 320, has recesses which are located at specified angular intervals from one another, in each of which a spring device 328 is inserted which ham a multiplicity of springs 30 (shown in FIG. 4) which are connected to one another by means of sliding blocks 333 (shown in FIG. 4 as sliding blocks 33) in a manner disclosed by DE 41 28 868 A1. The spring device 328 is supported on one end on the ring gear 324, and on the other end on the planet carrier 309, namely by means of actuation means which are not shown.

The spring device 328 is located in the axial direction between the two planetary carriers 309 which are firmly connected to one another in the radially outer area and to a flywheel 338 of a second centrifugal mass 345. The planetary carriers 309 define the boundaries of the abovementioned chamber 344, which is part of the centrifugal mass 345 and houses the gear wheels 307, 320 and 324 and the spring device 328, and is at least partly filled with a paste-like medium. The planetary carriers 309 protect the gear wheels 320 and 324 in the axial direction. The additional centrifugal mass 345 acts as an output-side transmission element 346, and provisions are made, in a manner not illustrated, to house a friction clutch or an interlocking clutch.

The planetary transmission 402 acts as a transmission 400 which is coupled back to the input-side transmission element 303. In the transmission, the planet wheels 320 are active as the transmission part 401, by means of which the direction of rotation of the ring gear 324 can be reversed with respect to the direction of rotation of the sun wheel 307.

The torsional vibration damper functions as follows:

When a torque is introduced, on which torsional vibrations are superimposed if an internal combustion engine is being used as the drive system, the movement thereby initiated on the input-side centrifugal mass 301 is transmitted to the sun wheel 307 which, on account of its geared engagement with the planet wheels 320, drives the latter. While the torque is transmitted via the planet wheels 320 to the planetary carriers 309 and thus to the output-side transmission element 346 without any change in the direction of rotation, the torsional vibration damper effects a reduction in the level of the torsional vibrations introduced with the torque. In this case, since the planetary carrier 309, on account of its inertia, is initially non-rotational, the movement of the sun wheel 307 is converted into a rotation of the planet wheels 320 around the respective needle bearing 318, and into a movement of the needle bearing 318 itself and thus of the ring gear 324, around the axis of rotation 354. Thus the moment corresponding to the torsional vibration is split, namely into a first partial moment which is transmitted via the planet wheels 320 to the planetary carriers 309, and a second partial moment which is transmitted to the ring gear 324 which acts as the intermediate mass 350. If the moment corresponding to the torsional vibration introduced to the sun wheel 307 is oriented clockwise, e.g. as shown in FIG. 2, then a first partial moment acting in the counterclockwise direction, by means of the rotation of the planet wheels 320, causes a displacement of the ring gear 324 from its rest position in the counterclockwise direction, while the planet carriers 309 are driven by a second partial moment which acts in the clockwise direction. Both partial moments cause reaction moments, consisting of the spring, inertial and friction moments, but in a different direction, and with, to some extent, mutually-offsetting actions. Consequently, there is a relatively small deformation of the springs 330 (shown in FIG. 4) of the spring device 328 and thus small relative rotations between the intermediate mass 350 and the output-side centrifugal mass 345, and thus also between the input-side and output-side centrifugal masses. Thus the mass moment of inertia for the drive system is apparently greater than that of a torsional vibration damper in which the individual masses are less rigidly connected to one another, as a result of which synchronization fluctuations of the drive system can be effectively smoothed.

The planetary transmission 402 is designed so that one portion of a moment connected with a torsional vibration is transmitted to the ring gear 324, and another portion is transmitted to the planetary carriers 309 which are connected to the output-side transmission element 346, which can preferably be achieved if the translation of the planetary transmission is greater than 1. The feedback effect from the ring gear 324 to the sun wheel 307 and thus to the input-side transmission element 303 is therefore high.

To achieve the above-mentioned advantageous translation ratio of greater than 1, the spring device 328 may not be located directly between the two transmission elements 303, 346, since otherwise the ring gear which acts as an intermediate mass 350 would be driven without translation, and thus a portion of the advantage gained by coupling the transmission 400 back to the input-side transmission element 303 would be wasted. Preferably, the spring device 328 is located between the intermediate mass 350 and the output-side transmission element 346, so that after transmission by the planet wheels 320, the moment corresponding to a torsional vibration first experiences a translation before it is transmitted to the intermediate mass 350 on one hand and to the output-side transmission element 346 on the other hand.

This translated moment of the torsional vibration results in a movement of the planetary carriers 309 relative to the ring gear 324, whereby the erring device 328 which is supported on the actuation means of the ring gear 324 and planetary carriers 309, causes a deformation of the springs 330 (shown in FIG. 4 as springs 30), and consequently a movement of the sliding blocks 333 along their guide track. The amount of the deformation travel of the spring device 328 is understandably a function of the translation ratio of the planetary transmission 402 and thus of the ratio of the numbers of teeth on the sun wheel 307 and the ring gear 324.

Since the chamber 344 in the output-side centrifugal mass 345 is filled with a paste-like medium, the pasty medium is displaced, during the above-mentioned rolling motion of the planet wheels 320 between the sun wheel and the ring gear 324, and during the deformation of the spring device 328, and when two teeth engage one another, the paste-like medium is pressed outward in the axial direction in the vicinity of the gear teeth, where it encounters the inner sides of the planetary carriers 309 and, on account of the rotational movement of the torsional vibration damper, is transported radially outward. When the springs 330 (shown in FIG. 4 as springs 30) are deformed, and with the resulting movement of the sliding blocks 333 toward one another, the pasty medium is also forced outward toward the insides of the planetary carriers 309. As the speed of displacement of the planetary carriers 309 increases, the speed of displacement of the pasty medium also increases, both between the gear teeth and in the vicinity of the spring device 328, but the resistance offered by the medium to this displacement also increases. Consequently, the damping caused by the medium is a function of the respective angular velocity at which the planetary carriers 309 are moved relative to the ring gear 324.

The selection of the spring constant for the plurality of springs 330 (shown in FIG. 4 as springs 30) in the spring device 328 can be made by one of several advantageous methods. These methods may include consideration of material specifications, stress analysis, design appearance, manufacturing methods, metallurgy, and heat treatment. Additional considerations may include use of the standard spring formulas, use of tables of spring characteristics, nomographs, charts and curves, as well as trial and error. Of particular consideration can be the modulus of elasticity which may include the torsional modulus for compression and extension.

For example, the trial and error method of determining the spring constant can be manifested by establishing a mock-up of the transmission 400 with its component elements and installing a plurality of springs 330 (shown in FIG. 4 as springs 30) in the spring device 328 with a plurality of pre-determined spring constants then applying torque comprising various torsional vibration moments. This method, if repeated through a range of spring constants under specified moments will permit the determination of the spring constant tuned to the maximum torsional vibration moment plus the transmission translation factor.

The disclosure now turns to an example of a conceivable variant of the torsional vibration damper as shown in at least one preferred embodiment of the present invention.

Figure 3:
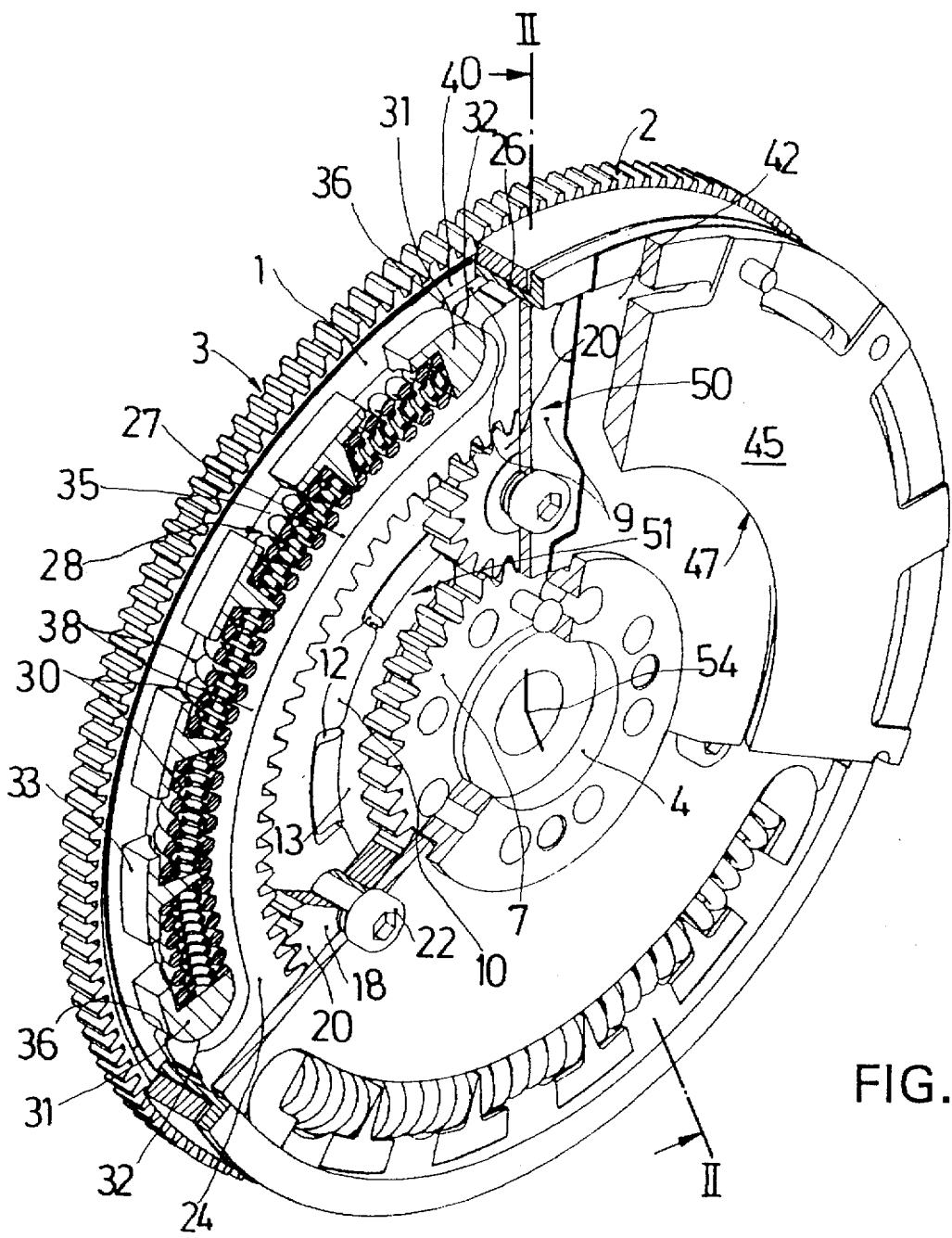
FIG. 3 shows a view in perspective of a torsional vibration damper with a planetary gearset located at least partly in a chamber filled with pasty medium, and an output-side spring device, in partial cross section.
Figure 4:
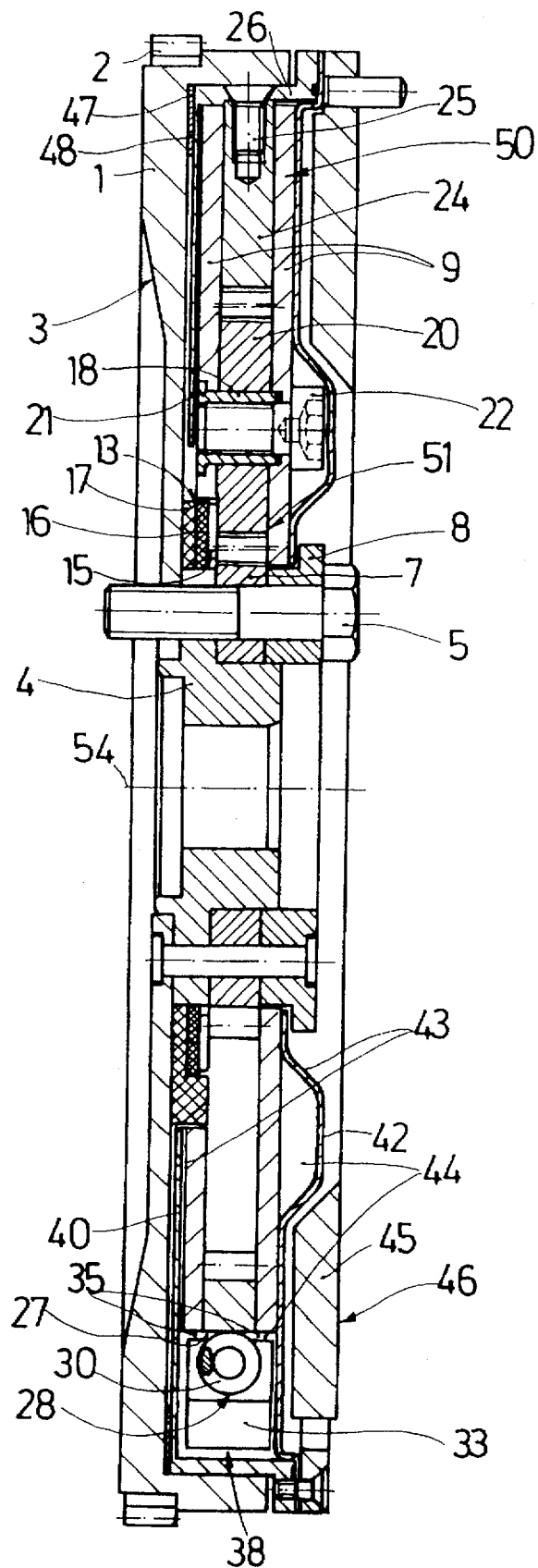
FIG. 4 shows a cross section along Line II—II in FIG. 3.

FIGS. 3 and 4 show a torsional vibration damper which, on its left side as shown in FIG. 4, has a centrifugal mass 1. The centrifugal mass 1 is essentially used to introduce a drive motion, and is preferably provided in its circumferential region with a toothed ring 2 for a starter pinion. The centrifugal mass 1 preferably acts as the driving-side transmission element 3.

The centrifugal mass 1 is preferably fastened by means of screws 5 to: a hub 4, which hub is preferably located on a crankshaft of an internal combustion engine; a sun gear 7 which is also preferably located on the hub and is preferably part of a planetary gearset; and a flange 8. The planetary gearset preferably has two planet carriers 9 located on both sides of the sun gear 7, and the two planet carriers 9 preferably act as intermediate masses 50. The planet carrier 9 shown on the right in FIG. 4 extends radially inward to the flange 8, while the planet carrier 9 on the left has projections 10 (see FIG. 3) on its radially inner end. The projections 10 are preferably engaged, with clearance in the circumferential direction, in recesses 12 of a friction device 13. Viewed in the axial direction, friction device 13 can preferably be located between the driving-side centrifugal mass 1 and the sun gear 7, and can preferably be formed by a spring plate 15, an intermediate ring 16 and a friction disc 17.

The two planet carriers 9 are preferably connected to one another in the axial direction by a plurality of bushings 18 located on the same diameter, or radius, and a planet wheel 20 located between the two planet carriers 9 is preferably rotationally mounted in, or on, each of the bushings 18. The bushings 18, pointing toward the axial connection of the two planet carriers 9, each preferably have an expanded, flange-like portion 21 on their sides facing the centrifugal mass 1, and are each preferably provided with an internal thread for the insertion of a screw 22, the head of which screw preferably comes into contact with the planet carrier 9 farther from the centrifugal mass 1 on the side of the planet carrier 9 away from the centrifugal mass 1. The planet wheels 20 are preferably engaged, on one hand, with the sun gear 7 and, on the other hand, with a ring gear 24 which is also located between the two planet carriers 9. The ring gear 24 is preferably fastened by means of screws 25 to a ring 26 which surrounds both the planet carriers 9 and the ring gear 24 in the circumferential region.

The ring gear 24, radially outside its toothed engagement with the planet wheels 20, preferably has recesses 27 which are at predetermined angular distances from one another, into each of which recesses a spring device 28 is preferably inserted. As shown in FIG. 3, this spring device 28 preferably has a number of springs 30, the outermost of which springs preferably come in contact via a stop element 31 against respective stop edges 32 of the ring gear 24. The individual springs 30 are preferably separated from one another by sliding blocks 33 which are guided on the inside of the ring 26. The spring device 28 is preferably engaged in the axial direction on both sides of the ring gear 24 in corresponding recesses 35 of the planet carriers 9, whereby the stop elements 31 are preferably in contact with stop edges 36 of the planet carriers 9.

A passage 38 is preferably formed by a recess 27 in the ring gear 24 and the corresponding recesses 35 in the planet carriers 9, to locate the spring device 28. The latter, on its side facing the centrifugal mass 1, is preferably closed in the axial direction by a first sealing plate 40, which is preferably designed as one piece with the ring 26 and extends radially inward into the vicinity of the friction device 13. The opposite side of the passage 38, viewed in the axial direction, is preferably closed by a sealing plate 42 which is fastened to the ring 26 and extends radially inward to the flange 8. The ring 26, together with the sealing plates 40 and 42, preferably forms a seal 43 for a chamber 44 which is located in an additional centrifugal mass 45. Chamber 44 preferably holds the planet carriers 9, the gear wheels 7, 20 and 24 and the spring device 28, and is preferably filled with a pasty medium. The additional centrifugal mass 45 is preferably permanently connected to the ring 26 and acts as the driven-side transmission element 46, which is preferably provided, in a manner not shown, to hold friction linings of a clutch.

The planet carriers 9 and the gear wheels 7, 20 and 24 located between them are preferably secured both in the radial direction and in the axial direction by the ring 26 which interacts with the sealing plates 40, 42. There is preferably a friction ring 48 which acts as an axial retainer 47 for the ring 26 between the two centrifugal masses 1 and 45, on the side of the flywheel 1, or centrifugal mass 1, facing the ring 26. This friction ring 48, in addition to its function indicated above, also preferably provides a basic friction for the torsional vibration damper, whereby the level of this basic friction can preferably be a function of the distance of the fraction ring 48 from the axis of rotation 54 of the torsional vibration damper.

The torsional vibration damper can preferably work as follows:

When a torque is introduced to the driving-side centrifugal mass 1, the resulting motion can preferably be transmitted to the sun gear 7 which, on account of its geared engagement with the planet wheels 20, drives the planet wheels 20. Since the ring gear 24 initially acts non-rotationally, the motion of the sun gear 7 is essentially converted into a rotation of the planet wheels 20 around the respective bushings 18 and into a motion of the bushings 18 themselves, and thus of the planet carriers 9, around the axis of rotation 54. The driving-side torque can thereby essentially be divided into components, namely:

a first partial moment which is transmitted via the planet wheels 20 to the planet carrier 9 which acts as an intermediate mass 50; and a second partial moment which is transmitted to the ring gear 24.

If the torque introduced at the sun gear 7 is oriented in the clockwise direction, as illustrated by way of example in FIG. 3, then a first partial moment which acts in the counter-clockwise direction essentially results in the rotation of the planet wheels 20, while the planet carriers 9 are essentially driven by a second partial moment which acts in the counterclockwise direction. The partial moments which counter-act one another, as a function of the translation of the planetary gearset, can essentially be greater than the driving-side torque, but if they are superimposed on one another, they can essentially result in a driven-side torque on the ring gear 24 which equals the driving-side torque minus the losses which occur in the torsional vibration damper. The driven-side torque, however, in contrast to the driving-side torque, can essentially be largely free of sudden changes in moment, since the spring device 28 located between the planet carrier 9 acting as the intermediate mass 50 and the spring device 28 located on the ring gear 24, on account of its deformation, can essentially produce an excursion of the above-mentioned elements 9 and 24 of the planetary gearset at different angles.

The spring device 28 can thereby preferably function as follows:

The movement of the planet carriers 9, relative to the ring gear 24, resulting from the torque introduced on the driving side, can essentially cause the stop elements 31 of the spring device 28 in contact with the stop edges 32 of the planet carriers 9 to separate from their seats on the stop edges 36 of the ring gear 24. This can essentially cause a deformation of the springs 30, and consequently a movement of the sliding blocks 33 along their guide track in the passage 38 on the inside of the ring 26. The amount of the deformation distance of the spring device 28 is thereby essentially a function of the translation ratio of the planetary gearset and thus of the ratio between the number of teeth of the sun gear 7 and the ring gear 24.

Since the chamber 44 in the driven-side centrifugal mass 45 bordered by the seal plates 40, 42 and the ring 26 is preferably filled with a pasty medium, during the above-mentioned rolling motion of the planet wheels between the sun gear and the ring gear 24 and the deformation of the spring device 28 inside the passage 38, the pasty medium is essentially displaced, whereby the medium is pushed outward in the axial direction in the vicinity of the gear teeth during the engagement of two teeth, where the medium encounters the inside of the planet carrier 9 and, on account of the rotational motion of the torsional vibration damper, is essentially discharged radially outward. In the passage 38, during the deformation of the springs 30 and the resulting movement of the sliding blocks 33 closer to one another, the pasty medium can also essentially be pushed out toward the insides of the planet carrier 9. As the excursion velocity of the planet carriers 9 increases, the displacement velocity of the pasty medium also essentially increases, both between the gear teeth and in the vicinity of the passage 38, but the resistance which the medium exerts against this displacement also increases. Consequently, the damping caused by the medium is essentially a function of the respective angular velocity with which the planet carriers 9 are moved relative to the ring gear 24.

However, the following should be noted with regard to this damping, which is essentially proportional to the velocity:

When the planetary gearset is designed for high partial moments, the phase during which the ring gear 24 is initially stationary is essentially very short, so that only a relatively small angular excursion of the planet carriers 9 is essentially required until drive occurs. The angular velocity of the planet wheels 20 is essentially correspondingly low, so that the damping caused by the pasty medium becomes very small. Consequently, for such a design of the planetary gearset, one conceivable solution is to have the ring gear 24 and the planet wheels 20 located outside the chamber 44 in a recess 51 provided for that purpose.

As soon as the planet carriers 9 have been moved, with a deformation of the spring device 28, by an angle of rotation with respect to the ring gear 24, the magnitude of which angle of rotation can essentially equal the width of the clearance which remains between the projections 10 formed radially inward on the planet carrier 9 shown on the left in FIG. 4 and the respective notch 12 of the friction device 13, as the excursion of the planet carriers continues, the friction plate 17 is driven. On account of the relative motion which now exists between the friction plate 17 and the driving-side centrifugal mass 1, there can essentially be a friction which decelerates the excursion motion of the planet carrier 9. In this case, the amount of this friction can also be influenced by the design of the planetary gearset, since a translation which favors large excursion angles of the planet carriers 9 with respect to the first centrifugal mass 1 can essentially create a large friction distance, while with a translation which creates large partial moments, the friction force can be more accurately tuned when a strong plate spring 15 is used.

The friction ring 48 which acts on the sealing plate 40 of the ring 26, and which is provided on the corresponding side of the driving-side centrifugal mass 1, is essentially continuously active.

The behavior of the torsional vibration damper during traction operation has been described up to this point. For thrust operation, the direction of the motion transmitted essentially changes, so that the motion is preferably transmitted via the driven-side centrifugal mass 45 and the ring 26 to the ring gear 24, and from the ring gear 24 via the planet wheels 20 to the sun gear 7. The sun gear 7 now can preferably act in a stationary manner, and can preferably transmit the aforementioned motion to the driving-side centrifugal mass 1. In this context, it should be noted that on account of the different number of teeth on the ring gear 24 and the sun gear 7, the internal translation during thrust operation can essentially be different from that during traction operation.

It will be appreciated, in accordance with at least one embodiment of an invention, that the arrangement of planet gears can preferably serve to maximize the moment of inertia from the driving side of the torsional vibration damper. Particularly, owing to their size, the planet gears will conceivably possess a considerable degree of rotational kinetic energy, which could, in accordance with at least one preferred embodiment of an invention, tend to maximize, or multiply, the moment of inertia experienced at the driven side.

In accordance with at least one preferred embodiment of an invention, large introduced torques can result in a small difference between the speed of the intermediate mass and the driven-side centrifugal mass, so that on the spring device, which is preferably engaged on one hand on the intermediate mass and on the other hand on one of the two centrifugal masses, essentially only a relatively small deformation occurs.

On the other hand, in accordance with at least one preferred embodiment of an invention, as a result of the corresponding design of the torsional vibration damper, small partial moments on the intermediate mass and on the respective output-side centrifugal mass can preferably result in a large difference in speed. In turn, the large difference in speed can preferably result in a significant deformation of the spring device and can have the effect of an apparently large momentum of the masses which are engaged with the spring device.

One feature of the invention resides broadly in the torsional vibration damper, in particular for clutches of motor vehicles, with an input-side transmission element and an output-side transmission element, at least one of which is connected, preferably by means of a spring device, with at least one moment-transmitting (torque-transmitting) element of a gear train which acts between the two transmission elements, characterized by the fact that at least one of the gear train elements 507, 520, 524 can be aligned, before the creation of a connection with the respective element carrier 503, 509, 546, with clearance 610 at least in one predetermined direction with respect to this element carrier 503, 509, 546, and after the application to the gear train 600 of an adjustment moment which effects an alignment of this gear train element 507, 520, 524 with respect to the other moment-transmitting transmission elements 507, 520, 524 as a function of load by moving the two transmission elements 503, 546 into a predetermined relative position, can be provided with a connection which fixes the gear train element 507, 520, 524 in its aligned position as a function of the load with respect to the element carrier 503, 509, 546.

Another feature of the invention resides broadly in the torsional vibration damper with a gear train in the form of a planetary gear train, characterized by the fact that the gear wheels (sun wheel 507, planet wheel 520, ring gear 524) of the planetary gear train 602 act as moment-transmitting transmission elements, at least one 507 of which can be aligned on its bearing seat with clearance 610 at least in the radial direction, and when the transmission elements 503, 546 are displaced into a specified relative position, is subjected to a static force under the effect of the adjustment moment by means of the engagement of its gear teeth with at least one other gear wheel 520, which process, by means of forces which act both in the radial direction and in the peripheral direction, causes a displacement of the gear wheel 507 with clearance by a maximum of the amount of the clearance.

Another feature of the invention resides broadly in the torsional vibration damper with a gear train in the form of a planetary gear train, characterized by the fact that the gear wheels (sun wheel 507, planet wheel 520, ring gear 524) of the planetary gear train 602 act as moment-transmitting transmission elements, at least one 507 of which can be aligned on its bearing seat with clearance 610 at least in the radial direction, and when the transmission elements 503, 546 are displaced into a specified relative position, is subjected to a static force under the effect of the adjustment moment by means of the engagement of its gear teeth with at least one other gear wheel 520, which static force, by means of forces which act both in the radial direction and in the peripheral direction, causes a displacement of the gear wheel 507 with clearance by a maximum of the amount of the clearance.

Yet another feature of the invention resides broadly in the torsional vibration damper characterized by the fact that the gear train element 507, 520, 524 which can be moved into its aligned position can be secured against movements in the radial direction by connecting it with the respective corresponding element carrier (transmission elements 503, 509, 546).

Still another feature of the invention resides broadly in the torsional vibration damper characterized by the fact that when gear wheels are used as the gear train elements 507, 520, 524, the connection can be created by producing a non-positive connection between at least one of the end faces of the gear wheel 507, 524 and a corresponding contact area of the respective element carrier 503, 546.

A further feature of the invention resides broadly in the torsional vibration damper characterized by the fact that the connection can be created by means of an integral connection between at least one of the end surfaces of the gear wheel 507, 524 and a corresponding contact area of the respective element carrier 503, 546.

Another feature of the invention resides broadly in the torsional vibration damper characterized by the fact that one of the gear wheels 507, 520 is located by means of its center hole with clearance 610 in the radial direction on a bearing element of the element carrier 503, 509, 546.

Yet another feature of the invention resides broadly in the method for the alignment in relation to one another and as a function of forces of moment-transmitting elements of a gear train which acts between an input-side transmission element and an output-side transmission element of a torsional vibration damper, in particular for clutches of motor vehicles, characterized by the following steps: a) The installation of at least one of the moment-transmitting gear train elements 507, 520, 524 before the creation of a connection to a corresponding element carrier 503, 509, 546 with clearance 610 in at least one predetermined direction; b) Application of an adjustment moment into the gear train 600 for the alignment of this gear train element 507, 520, 524 as a function of the force (moment?) with respect to the other gear train elements into a relative position of the two transmission elements 503, 546 with respect to one another corresponding to the adjustment moment; c) Fixing of the transmission elements 503, 546 in the predetermined relative position; d) Fastening of the gear train element 507, 520, 524 with clearance on the corresponding element carrier 503, 509, 546 to retain the alignment of the gear train element as a function of the force; e) Neutralization of the adjustment moment to allow a movement of the transmission elements 503, 546 back into their initial position under the effect of a spring device 528 which is deformed when the adjustment moment is introduced.

Examples of planetary gear mechanisms, components thereof, and components associated therewith, which may be utilized in accordance with at least one embodiment of the present invention, may be found in the following U.S. Pat. No. 5,222,923 issued Jun. 29, 1993 to Hotta et al., entitled "Planetary Gear Transmission"; U.S. Pat. No. 5,279,527 issued Jan. 18, 1994 to Crockett, entitled "Shiftless, Continuously-aligning Transmission"; U.S. Pat. No. 5,292, 290 issued Mar. 8, 1994 to Scholz et al., entitled "Transmission Arrangement for Vehicles"; U.S. Pat. No. 5,194,055 issued Mar. 16, 1993 to Oshidari, entitled "Planetary Gear Type Transmission Mechanism"; U.S. Pat. No. 5,370,590 issued Dec. 6, 1994 to Premiski et al., entitled "Securing Means for a Planetary Gear Unit"; and U.S. Pat. No. 5,342,258 issued Aug. 30, 1994 to Egyed, entitled "Combinational Incrementally Variable Transmissions and Other Gearing Arrangements Allowing Maximum Kinematic Degrees of Freedom".

Examples of clutches, and components associated therewith, which may be utilized in accordance with at least one embodiment of the present invention, may be found in the following U.S. Patents: U.S. Pat. No. 5,000,304 to Koch et al.; U.S. Pat. No. 4,941,558 to Schraut; U.S. Pat. No. 4,854,438 to Weissenberger et al.; U.S. Pat. No. 4,741,423 to Hayen; and U.S. Pat. No. 4,715,485 to Rostin et al.

Examples of torsional vibration dampers, and components associated therewith, which may be utilized in accordance with the embodiments of the present invention, may be found in the following U.S. Patents: U.S. Pat. No. 5,016,744, which issued to Fischer et al. on May 21, 1991; U.S. Pat. No. 4,433,771, which issued to Caray on Feb. 28, 1984; U.S. Pat. No. 4,684,007, which issued to Maucher on Aug. 4, 1987; U.S. Pat. No. 4,697,682, which issued to Alas et al. on Oct. 6, 1987; U.S. Pat. No. 4,890,712, which issued to Maucher et al. on Jan. 2, 1990; and U.S. Pat. No. 4,651,857, which issued to Schraut et al. on Mar. 24, 1987.

Examples of pasty media, which may be utilized in accordance with the embodiments of the present invention, may be found in the following U.S. Patents: U.S. Pat. No. 5,188,375, which issued to Pope et al.; U.S. Pat. No. 5,197,807, which issued to Kuznar; U.S. Pat. No. 5,240,457, which issued to Leichliter et al.; U.S. Pat. No. 5,195,063, which issued to Volker; U.S. Pat. No. 5,228,605, which issued to Schlicheimauer; U.S. Pat. No. 5,229,000, which issued to Ben-Nasr; U.S. Pat. No. 5,226,986 to Sakuta; U.S. Pat. No. 5,242,652 to Savigny; and U.S. Pat. No. 5,249,862 to Harold et al. The pasty media contemplated herein could conceivably include various well-known greases, oils, or other appropriate semi-solid or low-viscosity media.

The foreign patent publication applications, namely, Federal Republic of Germany Patent Application No. P 44 44 200.9, filed on Dec. 13, 1994, having inventor Jörg Sudau, and DE-OS P 44 44 200.9 and DE-PS P 44 44 200.9.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 04 209.3, filed on Feb. 9, 1995, having inventors Jörg Sudau and Erwin Wack, and DE-OS 195 04 209.3 and DE-PS 195 04 209.3, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A transmission system for a motor vehicle, said transmission system comprising:

a flywheel assembly, said flywheel assembly having an axis of rotation and defining an axial direction parallel to the axis of rotation;

a pressure plate disposed adjacent said flywheel assembly;

a clutch disc disposed between said pressure plate and said flywheel assembly;

said clutch disc comprising friction linings for contacting said pressure plate and said flywheel assembly upon engagement of said clutch disc;

a clutch housing disposed adjacent said pressure plate and being releasably fastened to said flywheel assembly;

said pressure plate being movably fastened to said clutch housing;

said pressure plate comprising means for engaging said clutch disc with said flywheel assembly;

said flywheel assembly comprising:
a first flywheel portion, said first flywheel portion comprising means for fastening said first flywheel portion to a crankshaft of an internal combustion engine;
a second flywheel portion disposed adjacent said first flywheel portion, said second flywheel portion being rotatable with respect to said first flywheel portion;
a planetary gear system;

said planetary gear system comprising a plurality of gear components;

said gear components comprising:
a) a sun gear,
b) a ring gear, and
c) at least one planetary gear;
means for fastening one of said gear components to one of:
said first flywheel portion; and
said second flywheel portion;

one of said gear components comprising means for providing clearance between said means for fastening and one of:
one of said flywheel portions; and
said one of said gear components fastened by said fastening means.

2. A method of assembling a transmission system for a motor vehicle, said transmission system comprising: a flywheel assembly, said flywheel assembly having an axis of rotation and defining an axial direction parallel to said axis of rotation; a pressure plate disposed adjacent said flywheel assembly; a clutch disc disposed between said pressure plate and said flywheel assembly; said clutch disc comprising friction linings for contacting said pressure plate and said flywheel assembly upon engagement of said clutch disc; a clutch housing disposed adjacent said pressure plate and being releasably fastened to said flywheel assembly; said pressure plate being movably fastened to said clutch housing; said pressure plate comprising means for engaging said clutch disc with said flywheel assembly; said flywheel assembly comprising: a first flywheel portion, said first flywheel portion comprising means for fastening said first flywheel portion to a crankshaft of an internal combustion engine; a second flywheel portion disposed adjacent said first flywheel portion, said second flywheel portion being rotatable with respect to said first flywheel portion; a planetary gear system; said planetary gear system comprising a plurality of gear components; said gear components comprising: a) a sun gear, b) a ring gear, and c) at least one planetary gear; means for fastening one of said gear components to one of: said first flywheel portion; and said second flywheel portion; said fastening means for fastening one of said gear components to one of: said first flywheel portion; and said second flywheel portion; and one of said gear components comprising means for providing clearance between said means for fastening and one of: one of said flywheel portions; and said one of said gear components fastened by said fastening means;

said method comprising the steps of:
providing a flywheel assembly, said flywheel assembly having an axis of rotation and defining an axial direction parallel to the axis of rotation;
providing a pressure plate;
providing a clutch disc;
providing said clutch disc with friction linings for contacting said pressure plate and said flywheel assembly upon engagement of said clutch disc;
providing a clutch housing;
providing said pressure plate with means for engaging said clutch disc with said flywheel assembly;
providing said flywheel assembly with:
a first flywheel portion;
means for fastening said first flywheel portion to a crankshaft of an internal combustion engine;
a second flywheel portion, said second flywheel portion being rotatable with respect to said first flywheel portion;
a planetary gear system;
providing said planetary gear system with a plurality of gear components, said gear components comprising:
a) a sun gear,
b) a ring gear, and
c) at least one planetary gear;
providing means for fastening one of said gear components to one of:
said first flywheel portion; and
said second flywheel portion; and
providing one of said gear components with means for providing clearance between said means for fastening and one of:
one of said flywheel portions; and
said one of said gear components fastened by said fastening means;

said method further comprising the steps of:
disposing said pressure plate adjacent said flywheel assembly;
disposing said clutch disc between said pressure plate and said flywheel assembly;
disposing said clutch housing adjacent said pressure plate;
releasably fastening said clutch housing to said flywheel assembly;
movably fastening said pressure plate to said clutch housing;
fastening said first flywheel portion to a crankshaft of an internal combustion engine with said fadtening means;
disposing said second flywheel portion adjacent said first flywheel portion;
disposing at least one of said gear components with respect to another of said gear components;

disposing said means for fastening within said means for providing a clearance;

aligning said at least one of said gear components adjusting a position of said fastening means within said means for providing clearance; and fastening said one of said gear components to at least one of said one of:
said first flywheel portion; and
said second flywheel portion while maintaining the position of said means for fastening within said means for providing clearance.

3. The method of assembling a transmission system according to claim 2, further comprising the following steps:

installing said at least one of said gear components before the creation of a connection to a corresponding element carrier with clearance in at least one predetermined direction;

applying an adjustment moment into the planetary gear system for the alignment of said at least one of said gear components as a function of the moment with respect to the other of said at least one of said gear components into a relative position of said first flywheel portion and said second flywheel portion with respect to one another corresponding to the adjustment moment;

fixing said first flywheel portion and said second flywheel portion in the predetermined relative position;

fastening said at least one of said gear components with clearance on the corresponding element carrier to retain the alignment of said at least one of said gear components as a function of the force;

neutralizing the adjustment moment to allow a movement of said first flywheel portion and said second flywheel portion back into their initial position under the effect of a spring device which is deformed when the adjustment moment is introduced.

4. Torsional vibration damper, for clutches of motor vehicles, with an input-side transmission element and an output-side transmission element, at least one of which is connected, preferably by means of a spring device, with at least one moment-transmitting element of a gear train which acts between the two transmission elements, said at least one moment-transmitting element comprising a plurality of gear train elements, wherein at least one of the gear train elements can be aligned, before the creation of a connection with a respective element carrier, with clearance at least in one predetermined direction with respect to the respective element carrier, and after the application to the gear train of an adjustment moment which effects an alignment of this gear train element with respect to the other moment-transmitting transmission elements as a function of load by moving the two transmission elements into a predetermined relative position, can be provided with a connection which fixes the gear train element in its aligned position as a function of the load with respect to the respective element carrier.

5. Torsional vibration damper according to claim 4, with a gear train in the form of a planetary gear train, said planetary gear train comprising a plurality of gear wheels, wherein the gear wheels (sun wheel, planet wheel, ring gear) of the planetary gear train act as moment-transmitting transmission elements, at least one of which can be aligned on its bearing seat with clearance at least in the radial direction, and when the transmission elements are displaced into a specified relative position, is subjected to a static force under the effect of the adjustment moment by means of the engagement of its gear teeth with at least one other gear wheel, which process, by means of forces which act both in the radial direction and in the peripheral direction, causes a displacement of the gear wheel with clearance by a maximum of the amount of the clearance.

6. Torsional vibration damper as claimed in claim 5, wherein the gear train element which can be moved into its aligned position can be secured against movements in the radial direction by connecting it with the respective element carrier.

7. Torsional vibration damper as claimed in claim 5, wherein one of the gear wheels is located by means of its center hole with clearance in the radial direction on a bearing element of the element carrier.

8. Torsional vibration damper according to claim 4, wherein the gear train element which can be moved into its aligned position can be secured against movements in the radial direction by connecting it with the respective element carrier.

9. Torsional vibration damper as claimed in claim 8, wherein when gear wheels are used as the gear train elements, the connection can be created by producing a non-positive connection between at least one of the end faces of the gear wheel and a corresponding contact area of the respective element carrier.

10. Torsional vibration damper as claimed in claim 8, wherein when gear wheels are used as the gear train elements, the connection can be created by producing a non-positive connection between at least one of the end faces of the gear wheel and a corresponding contact area of the respective element carrier.

11. Torsional vibration damper as claimed in claim 8, wherein the connection can be created by means of an integral connection between at least one of the end surfaces of the gear wheel and a corresponding contact area of the respective element carrier.

12. Torsional vibration damper as claimed in claim 8, wherein the connection can be created by means of an integral connection between at least one of the end surfaces of the gear wheel and a corresponding contact area of the respective element carrier.

13. Torsional vibration damper as claimed in claim 4, wherein one of the gear wheels is located by means of its center hole with clearance in the radial direction on a bearing element of the element carrier.

* * * * *

UNITED STATES PATENT AND TRADEMARK OFFICE
CERTIFICATE OF CORRECTION

PATENT NO. : 5,733,218    Page 1 of 2
DATED : March 31, 1998
INVENTOR(S) : Jörg SUDAU and Erwin WACK It is certified that error appears in the above-identified patent and that said Letters Patent is hereby corrected as shown below:

On the title page, item [56], under the U.S. PATENT DOCUMENTS section, before 'Winter et al.', delete "3,696,789   10/1972" and insert --3,626,789  12/1971--.

On the title page, item [56], under the U.S. PATENT DOCUMENTS section, after the ' Takahashi et al. 475/346X' reference, add the following reference:
    --5,078,246  1/1992  Rohs et al.--.

On the title page, item [56], under the FOREIGN PATENT DOCUMENTS section, add the following references:

--2728040        6/1996        France
      2606111        5/1988        France
      2296072        6/1996        Great Britain--.

UNITED STATES PATENT AND TRADEMARK OFFICE
CERTIFICATE OF CORRECTION

PATENT NO. : 5,733,218
DATED : March 31, 1998
INVENTOR(S) : Jürg SUDAU and Erwin WACK It is certified that error appears in the above-identified patent and that said Letters Patent is hereby corrected as shown below:

In column 10, line 22, after the second occurrence of 'which', delete "ham" and insert --has--.

In column 20, line 61, Claim 2, after 'said', delete "fadtening" and insert --fastening--.

Signed and Sealed this

Twenty-seventh Day of April, 1999

Attest:

Q. TODD DICKINSON

*Attesting Officer*  *Acting Commissioner of Patents and Trademarks*